United States Patent
Chan et al.

(10) Patent No.: US 11,855,710 B2
(45) Date of Patent: Dec. 26, 2023

(54) ECHO CANCELLATION DEVICE AND ECHO CANCELLATION METHOD THEREOF APPLIED IN COMMUNICATION DEVICE

(71) Applicant: Faraday Technology Corp., Hsinchu (TW)

(72) Inventors: Chia Jung Chan, Hsinchu (TW); Wei-Cyuan Wu, Hsinchu (TW)

(73) Assignee: Faraday Technology Corp., Hsinchu (TW)

( * ) Notice: Subject to any disclaimer, the term of this patent is extended or adjusted under 35 U.S.C. 154(b) by 457 days.

(21) Appl. No.: 17/191,655

(22) Filed: Mar. 3, 2021

(65) Prior Publication Data
US 2022/0209818 A1    Jun. 30, 2022

(30) Foreign Application Priority Data
Dec. 28, 2020   (TW) ................. 109146423

(51) Int. Cl.
*H04B 3/23*    (2006.01)

(52) U.S. Cl.
CPC .................. *H04B 3/231* (2013.01)

(58) Field of Classification Search
CPC ... H04B 3/03; H04B 3/20; H04B 3/23; H04B 3/231; H04B 3/235; H04B 3/237
USPC ........ 375/229, 232, 257, 346; 370/286, 290; 379/406.01, 406.02, 406.05, 406.08, 379/406.09
See application file for complete search history.

(56) References Cited

U.S. PATENT DOCUMENTS

| | | | | |
|---|---|---|---|---|
| 5,136,577 A | * | 8/1992 | Amano | H04M 9/082 |
| | | | | 379/406.14 |
| 7,003,101 B2 | | 2/2006 | Seibert | |
| 7,023,963 B1 | * | 4/2006 | Chu | H04M 3/085 |
| | | | | 379/22.03 |
| 7,352,776 B1 | * | 4/2008 | Hauptmann | H04Q 11/0442 |
| | | | | 370/488 |

(Continued)

FOREIGN PATENT DOCUMENTS

| | | |
|---|---|---|
| CN | 101213764 | 7/2008 |
| CN | 108605298 | 9/2018 |
| TW | 386325 | 4/2000 |

OTHER PUBLICATIONS

"Office Action of Taiwan Counterpart Application", dated Jul. 8, 2021, p. 1-p. 5.

*Primary Examiner* — Young T. Tse
(74) *Attorney, Agent, or Firm* — JCIPRNET

(57) ABSTRACT

An echo cancellation device and an echo cancellation method thereof applied in a communication device are provided. The echo cancellation device includes an echo canceller and a combine circuit. The echo canceller obtains a plurality of delayed signals from a local signal of the communication device, and the delayed signals are divided into a plurality of delayed signal groups. The echo canceller selectively ignores at least one of the delayed signal groups, and the echo canceller generates an echo cancellation signal with the others of the delayed signal groups. The combine circuit is coupled to an interface circuit of the communication device to receive a received signal. The combine circuit cancels an echo component of the received signal with the echo cancellation signal to generate a cancelled signal.

12 Claims, 5 Drawing Sheets

(56) References Cited

U.S. PATENT DOCUMENTS

| | | | |
|---|---|---|---|
| 8,994,926 B2* | 3/2015 | Dyer | G01S 7/4876 356/3.01 |
| 2010/0048137 A1* | 2/2010 | Liu | H04B 3/23 455/63.1 |
| 2018/0190258 A1 | 7/2018 | Mohammad et al. | |

* cited by examiner

ECHO CANCELLATION DEVICE AND ECHO CANCELLATION METHOD THEREOF APPLIED IN COMMUNICATION DEVICE

CROSS-REFERENCE TO RELATED APPLICATION

This application claims the priority benefit of Taiwanese application no. 109146423, filed on Dec. 28, 2020. The entirety of the above-mentioned patent application is hereby incorporated by reference herein and made a part of this specification.

BACKGROUND

Technical Field

The disclosure relates to a communication device; particularly, the disclosure relates to an echo cancellation device and an echo cancellation method thereof applied in a communication device.

Description of Related Art

A local communication device may transmit a local signal to a far end device through a communication channel, and receive a far end signal sent by the far end device through the communication channel. Specifically speaking, an interface circuit of the local communication device may transmit the local signal output by a transmitter circuit to the communication channel and receive the far end signal from the communication channel. The interface circuit of the local communication device may output a received signal corresponding to the far end signal to a receiver circuit of the local communication device. Generally speaking, the far end device is also configured with an interface circuit to establish a connection with the local communication device through the communication channel. During transmission of the local signal of the local communication device to the far end device, if an impedance of the communication channel does not match an impedance of the interface circuit (the interface circuit of the local communication device and/or the interface circuit of the far end device), an echo signal will be generated. That is, the received signal output by the interface circuit includes an echo component (noise). The echo component of the received signal requires to be cancelled.

SUMMARY

The disclosure provides an echo cancellation device and an echo cancellation method thereof adapted for a communication device to cancel an echo component of a received signal on the premise of reducing the number of calculations as much as possible.

In an embodiment of the disclosure, an echo cancellation device includes an echo canceller and a combine circuit. The echo canceller is configured to obtain a plurality of delayed signals from a local signal of the communication device, where the delayed signals are divided into a plurality of delayed signal groups. The echo canceller selectively ignores at least one of the delayed signal groups, and the echo canceller generates an echo cancellation signal with the others of the delayed signal groups. The combine circuit is coupled to the echo canceller to receive the echo cancellation signal. The combine circuit is coupled to an interface circuit of the communication device to receive a received signal. The combine circuit cancels an echo component of the received signal with the echo cancellation signal to generate a cancelled signal.

In an embodiment of the disclosure, an echo cancellation method includes the following. A plurality of delayed signals are obtained from a local signal of the communication device by an echo canceller, where the delayed signals are divided into a plurality of delayed signal groups. At least one of the delayed signal groups is selectively ignored, and an echo cancellation signal is generated with the others of the delayed signal groups by the echo canceller. A received signal is received from an interface circuit of the communication device, and an echo component of the received signal is cancelled with the echo cancellation signal to generate a cancelled signal by a combine circuit.

Based on the foregoing, according to the embodiment of the disclosure, the communication device and the echo cancellation method thereof may selectively ignore at least one delayed signal group of the delayed signal groups, and generates the echo cancellation signal with the other delayed signal groups of the delayed signal groups. Therefore, the communication device cancels the echo component of the received signal on the premise of reducing the number of calculations as much as possible.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
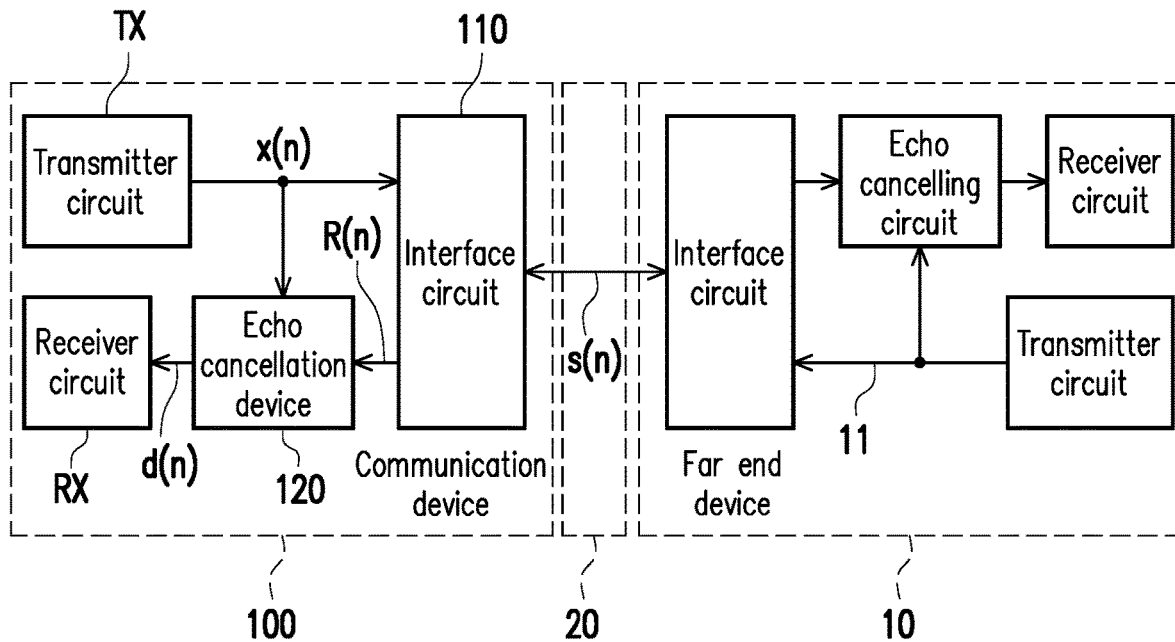
FIG. 1 is a schematic circuit block diagram of a communication device according to an embodiment of the disclosure.

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or some connection means to the second device. The terms "first", "second", and similar terms mentioned throughout the whole specification of the present application (including the appended claims) are merely used to name discrete elements or to differentiate among different embodiments or ranges, instead of limiting an upper bound or lower bound of the number of elements or the sequence of elements. In addition, wherever possible, elements/components/steps using the same reference numerals in the drawings and the embodiments represent the same or similar parts. Reference may be mutually made to related descriptions of elements/components/steps using the same reference numerals or the same terms in different embodiments.

FIG. 1 is a schematic circuit block diagram of a communication device 100 according to an embodiment of the disclosure. The communication device 100 as shown in FIG. 1 may establish a connection with a far end device 10 through a communication channel 20. Depending on design requirements, the communication channel 20 may include wires or other communication media. The wire of the communication channel 20 may be, for example (but not limited to), a 1000BASE-T cable, a 1000BASE-TX cable, or other communication cables. Depending on design requirements, in some embodiments, the far end device 10 may analogized with reference to the related description to the communication device 100, so the implementation of the far end device 10 will not be repeatedly described.

In the embodiment as shown in FIG. 1, the communication device 100 includes a transmitter circuit TX, an interface circuit 110, an echo cancellation device 120, and a receiver circuit RX. The interface circuit 110 is coupled to the transmitter circuit TX to receive a local signal x(n). The echo cancellation device 120 is coupled to the interface circuit 110 and the transmitter circuit TX to receive a received signal R(n) and the local signal x(n). The receiver circuit RX is coupled to the echo cancellation device 120 to receive a cancelled signal d(n).

Depending on different design requirements, the implementation of the echo cancellation device 120 may be hardware, firmware, software (i.e., program) or a combination of more than one of the three. In terms of the hardware form, the echo cancellation device 120 may be implemented in a logic circuit on an integrated circuit. Relevant functions of the echo cancellation device 120 may be implemented as hardware utilizing hardware description languages (e.g., Verilog HDL or VHDL) or other suitable programming languages. For example, the relevant functions of the echo cancellation device 120 may be implemented in various logic blocks, modules, and circuits in one or more controllers, microcontrollers, microprocessors, application-specific integrated circuits (ASIC), digital signal processors (DSP), field programmable gate arrays (FPGA), and/or other processing units. In terms of the software and/or firmware form, the relevant functions of the echo cancellation device 120 may be implemented as programming codes. For example, the echo cancellation device 120 may be implemented with general programming languages (e.g., C, C++, or assembly language) or other suitable programming languages. The programming codes may be recorded/stored in a recording medium. The controller, microcontroller, or microprocessor may read and execute the programming codes from the recording medium, so as to realize the relevant functions of the echo cancellation device 120.

The interface circuit 110 may transmit the local signal x(n) of the transmitter circuit TX of the communication device 100 through the communication channel 20 to the far end device 10. The echo cancellation device 120 may obtain a plurality of delayed signals (delayed elements) from the local signal x(n), where the delayed signals may be divided into a plurality of delayed signal groups. The far end device 10 may transmit a far end signal 11 through the communication channel 20 to the communication device 100. The interface circuit 110 may receive a far end signal s(n) corresponding to the far end signal 11 from the communication channel 20, where the far end signal s(n) is the far end signal 11 passing through the channel. The interface circuit 110 may output the received signal R(n) corresponding to the far end signal s(n) to the echo cancellation device 120.

During the process where the transmitter circuit TX transmits the local signal x(n) to an interface circuit of the far end device 10, if an impedance of the transmission wire (the communication channel 20) does not match an impedance of the interface circuit (the interface circuit 110 of the communication device 100 and/or the interface circuit of the far end device 10), an echo signal will be generated in the transmission path. The echo signal (noise) will be returned to the communication device 100 and form an echo component of the received signal R(n). Generally speaking, components of the far end signal s(n) include the far end signal 11 and a far end echo, and components of the received signal R(n) include the far end signal s(n) and a near end echo. The echo cancellation device 120 is required for cancelling the echo component of the received signal R(n). Depending on design requirements, the echo cancellation device 120 may be configured with an adjustable finite impulse response (FIR) filter, least mean square (LMS) filter and/or other filters.

It is assumed herein that the echo cancellation device 120 may obtain N delayed signals $x_1, x_2, \ldots, x_N$ (not shown in FIG. 1) from the local signal x(n), where the N delayed signals $x_1$ to $x_N$ may be divided into B delayed signal groups $X_1, X_2, \ldots, X_B$ (not shown in FIG. 1). Depending on design requirements, the N and the B may be arbitrary integers. The echo cancellation device 120 may selectively ignore at least one delayed signal group of the delayed signal groups $X_1$ to $X_B$, and the echo cancellation device 120 generates an echo cancellation signal y(n) (not shown in FIG. 1) taking the other delayed signal groups of the delayed signal groups $X_1$ to $X_B$ as tap input groups. The echo cancellation device 120 cancels the echo component of the received signal R(n) with the echo cancellation signal y(n) to generate the cancelled signal d(n) to the receiver circuit RX.

Figure 2:
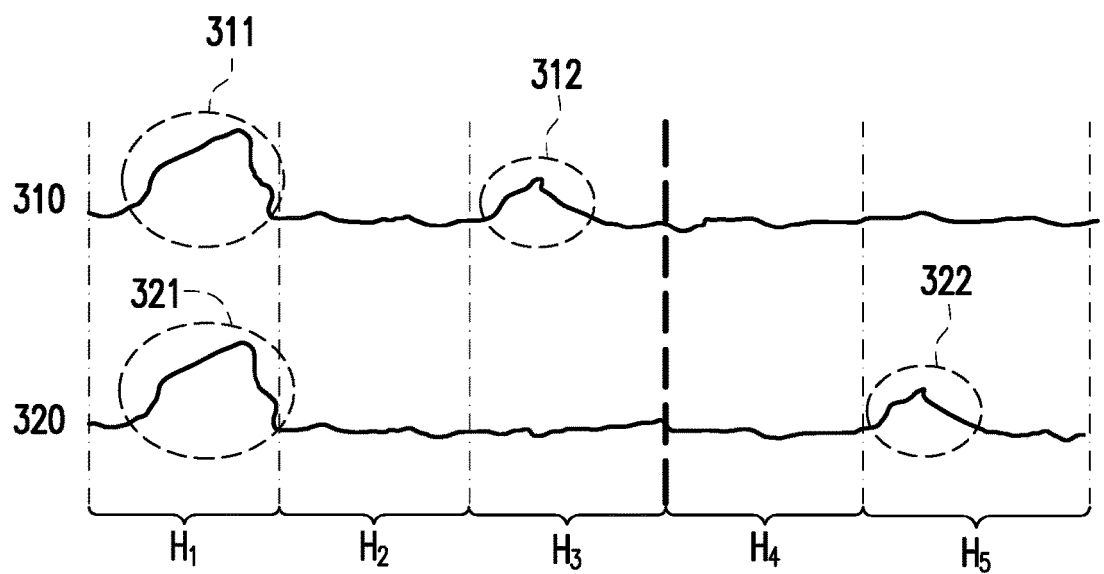
FIG. 2 is a schematic diagram of impulse response curves of the received signal as shown in FIG. 1 with the communication channel of different lengths according to an embodiment of the disclosure.

FIG. 2 is a schematic diagram of impulse response curves of the echo component of the received signal R(n) (FIG. 2 relates to an impulse response of the echo component of the received signal R(n)) as shown in FIG. 1 with the communication channel 20 of different lengths according to an embodiment of the disclosure. The horizontal axis of the impulse response curves as shown in FIG. 2 is related to tap coefficient groups (corresponding coefficient groups) $H_1$ to $H_N$, for example, the tap coefficient groups $H_1$, $H_2$, $H_3$, $H_4$, and $H_5$ as shown in FIG. 2. With reference to FIG. 1 and FIG. 2, an impulse response curve 310 as shown in FIG. 2 is an impulse response curve of the received signal R(n) where the communication channel 20 is a short wire. In the impulse response curve 310, an impulse 311 indicates a near end echo, and an impulse 312 indicates a far end echo. An impulse response curve 320 as shown in FIG. 2 is an impulse response curve of the received signal R(n) where the communication channel 20 is a long wire. In the impulse response curve 320, an impulse 321 indicates a near end echo, and an impulse 322 indicates a far end echo.

Assuming herein that the echo cancellation device 120 may obtain 160 delayed signals $x_1$ to $x_{160}$ (not shown) (i.e., N=160) from the local signal x(n), where the delayed signals $x_1$ to $x_{160}$ may be equally divided into 5 delayed signal groups $X_1$, $X_2$, $X_3$, $X_4$, and $X_5$ (not shown) (i.e., B=5), then each of the delayed signal groups includes 160/5=32 delayed signals, and the tap coefficient groups $H_1$ to $H_5$ correspond to the delayed signal groups $X_1$ to $X_5$. Where the echo cancellation device 120 does not ignore any of the delayed signal groups $X_1$ to $X_5$, the echo cancellation device 120 takes the delayed signal groups $X_1$ to $X_5$ as tap input groups, and the echo cancellation device 120 may calculate the echo cancellation signal y(n) (not shown in FIG. 1) with Formula 1 below. In Formula 1, a coefficient $h_{[(b-1)*N/B]+k}$ represents a $k^{th}$ tap coefficient in a $b^{th}$ tap coefficient group $H_b$, namely a tap coefficient of a $k^{th}$ delayed signal $x_{[(b-1)*N/B]+k}$ in a $b^{th}$ delayed signal group $X_b$. That is, the echo cancellation device 120 may generate the echo cancellation signal y(n) taking all of the delayed signal groups $X_1$ to $X_5$ as tap input groups.

$$y(n) = \sum_{b=1}^{B} H_b * X_b = \sum_{b=1}^{B} \sum_{k=1}^{N/B} h_{[(b-1)*N/B]+k} * x_{[(b-1)*N/B]+k} \quad \text{Formula 1}$$

It can be observed from the impulse response curve 310 as shown in FIG. 2 that, where the communication channel 20 is a short wire, the echo cancellation device 120 may selectively ignore calculation of the echo cancellation signal for the delayed signal group $X_4$ and (or) $X_5$, so that the communication device 100 may effectively reduce the number of calculations without affecting the echo cancellation. By analogy, it can be observed from the impulse response curve 320 as shown in FIG. 2 that, where the communication channel 20 is a long wire, the echo cancellation device 120 may selectively ignore calculation of the echo cancellation signal for the delayed signal group $X_2$ and (or) $X_3$, so that the communication device 100 may effectively reduce the number of calculations without affecting the echo cancellation. That is, with the property that echo impulse responses are mostly sparse, the echo cancellation device 120 may ignore calculation of the echo cancellation signal for a corresponding sparse portion to reduce the number of calculations. The portion where the impulse response is sparsely distributed is related to length information of the channel. The echo cancellation device 120 may determine to ignore calculation of the echo cancellation signal for the corresponding sparse portion according to the wire length.

In the embodiment as shown in FIG. 1, the echo cancellation device 120 may dynamically determine to be ignore which of the delayed signal groups $X_1$ to $X_5$ according to a length of the communication channel 20. Taking the impulse response curve 310 (the communication channel 20 being a short wire) as an example, the echo cancellation device 120 may dynamically determine to ignore one (or more) delayed signal group of the delayed signal groups $X_2$, $X_4$, and $X_5$. Taking the impulse response curve 320 (the communication channel 20 being a long wire) as an example, the echo cancellation device 120 may dynamically determine to ignore one (or more) delayed signal group of the delayed signal groups $X_2$, $X_3$, and $X_4$.

Figure 3:
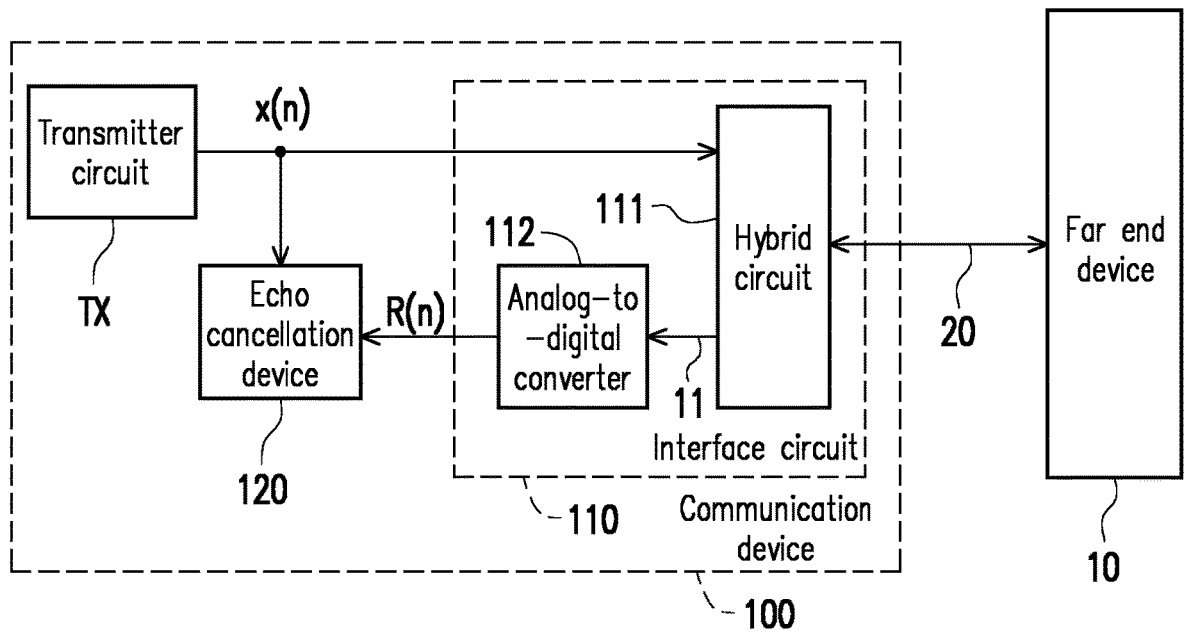
FIG. 3 is a schematic circuit block diagram showing the interface circuit as shown in FIG. 1 according to an embodiment of the disclosure.

FIG. 3 is a schematic circuit block diagram showing the interface circuit 110 as shown in FIG. 1 according to an embodiment of the disclosure. In the embodiment as shown in FIG. 3, the interface circuit 110 includes a hybrid circuit 111 and an analog-to-digital converter (ADC) 112. The hybrid circuit 111 is adapted for transmitting the local signal x(n) to the communication channel 20 and receiving the far end signal 11 through the communication channel 20. The analog-to-digital converter 112 is coupled to the hybrid circuit 111 to receive the far end signal 11. The analog-to-digital converter 112 is configured to convert the far end signal 11 into the received signal R(n).

Figure 4:
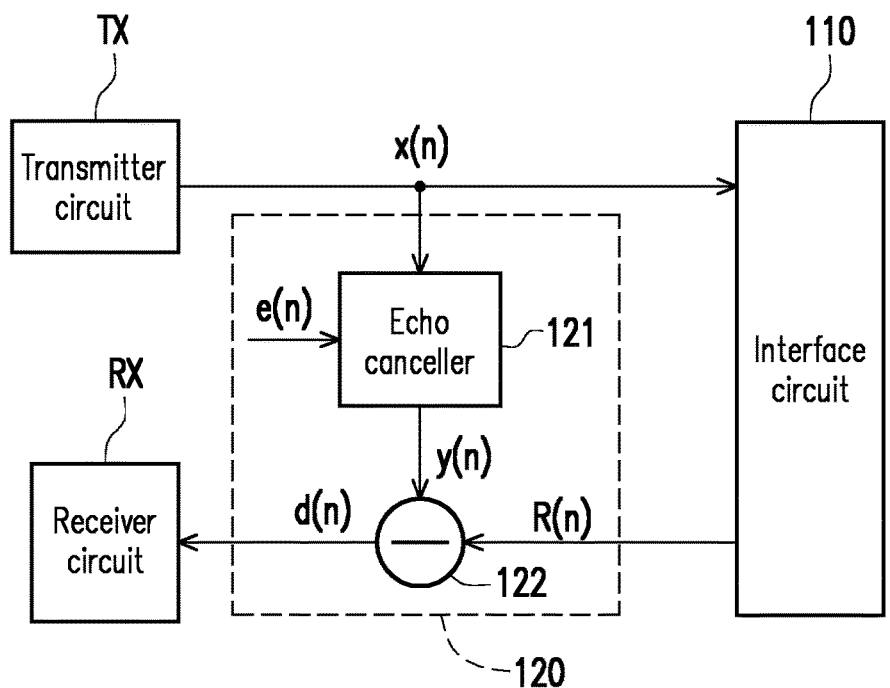
FIG. 4 is a schematic circuit block diagram showing the echo cancellation device as shown in FIG. 1 according to an embodiment of the disclosure.

FIG. 4 is a schematic circuit block diagram showing the echo cancellation device 120 as shown in FIG. 1 according to an embodiment of the disclosure. In the embodiment as shown in FIG. 4, the echo cancellation device 120 includes an echo canceller 121 and a combine circuit 122. The echo canceller 121 may obtain N delayed signals $x_1$ to $x_N$ (not shown in FIG. 4) from the local signal x(n), where the delayed signals $x_1$ to $x_N$ may be equally divided into B delayed signal groups $X_1$ to $X_B$, and each delayed signal group includes N/B delayed signals. For example, the echo canceller 121 may obtain 160 delayed signals $x_1$ to $x_{160}$ from the local signal x(n), where the delayed signals $x_1$ to $x_{160}$ may be equally divided into 5 delayed signal groups $X_1$ to $X_5$, and each delayed signal group includes 160/5=32 delayed signals. The delayed signal group $X_1$ includes the delayed signals $x_1$ to $x_{32}$, the delayed signal group $X_2$ includes the delayed signals $x_{33}$ to $x_{65}$, the delayed signal group $X_3$ includes the delayed signals $x_{65}$ to $x_{96}$, the delayed signal group $X_4$ includes the delayed signals $x_{97}$ to $x_{128}$, and the delayed signal group $X_5$ includes the delayed signals $x_{129}$ to $x_{160}$.

Figure 5:
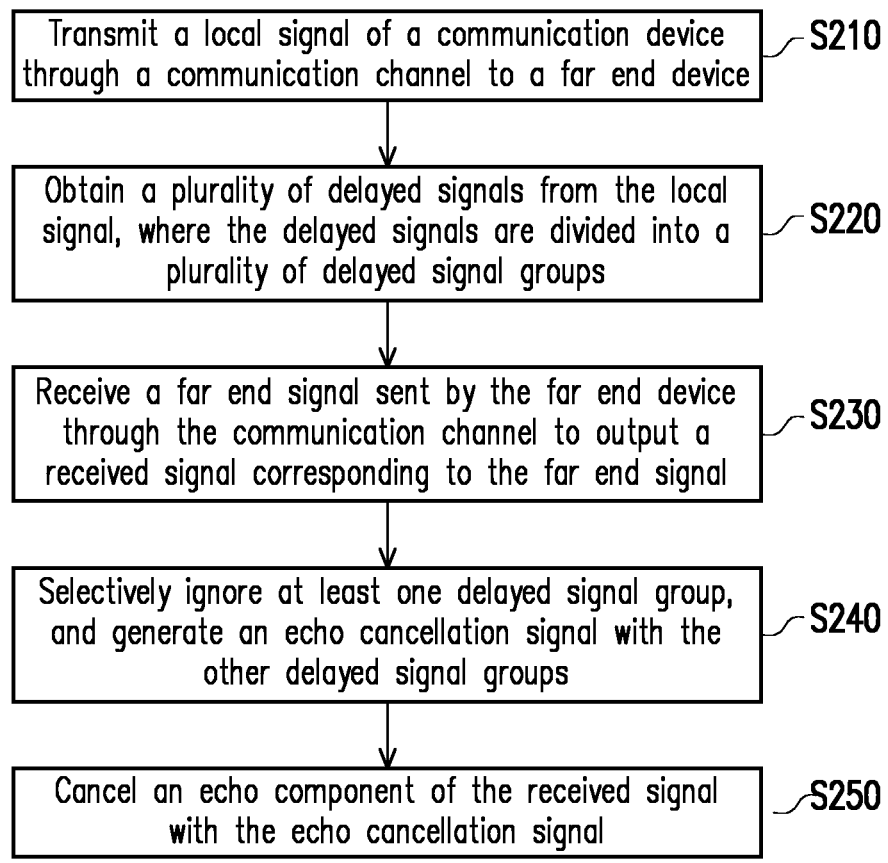
FIG. 5 is a schematic flow chart of an echo cancellation method of a communication device according to an embodiment of the disclosure.

FIG. 5 is a schematic flow chart of an echo cancellation method of a communication device according to an embodiment of the disclosure. With reference to FIG. 4 and FIG. 5, in step S210, the interface circuit 110 may transmit the local signal x(n) of the communication device 100 through the communication channel 20 to the far end device 10. In step S220, the echo canceller 121 may obtain a plurality of delayed signals (delayed elements) from the local signal x(n) of the communication device 100. It is assumed herein that, in step S220, the echo canceller 121 obtains N delayed signals $x_1$, $x_2$, ..., $x_N$ (not shown in FIG. 4) from the local signal x(n), where the N delayed signals $x_1$ to $x_N$ are divided into B delayed signal groups $X_1$, $X_2$, ..., $X_B$ (not shown in FIG. 4). Depending on design requirements, the N and the B may be arbitrary integers. In step S230, the interface circuit 110 of the communication device 100 may receive the far end signal 11 sent by the far end device 10 through the communication channel 20, that is, receive the far end signal s(n) from the communication channel 20, to output the received signal R(n) corresponding to the far end signal s(n) to the echo cancellation device 120.

In step S240, the echo canceller 121 may selectively ignore at least one of the delayed signal groups $X_1$ to $X_B$, and the echo canceller 121 may generate the echo cancellation signal y(n) taking the other groups of the delayed signal groups $X_1$ to $X_B$ as tap input groups. For example, the echo canceller 121 may adaptively adjust a filter coefficient according to an echo noise (a residual echo) e(n) after echo cancellation. The echo noise e(n) may be a difference between the cancelled signal d(n) and the far end signal s(n).

That is, e(n)=d(n)−s(n). According to the echo noise e(n), the echo canceller 121 may generate the echo cancellation signal y(n) with the tap input groups. The combine circuit 122 is coupled to the echo canceller 121 to receive the echo cancellation signal y(n). In step S250, the combine circuit 122 is coupled to the interface circuit 110 of the communication device 100 to receive the received signal R(n). In step S250, the combine circuit 122 may cancel the echo component of the received signal R(n) with the echo cancellation signal y(n) to generate a cancelled signal d(n) to the receiver circuit RX.

Taking the embodiment as shown in FIG. 2 as an example, the echo canceller 121 may dynamically determine to ignore which of the delayed signal groups $X_1$ to $X_5$ according to the length of the communication channel 20. Where the communication channel 20 is a short wire (the impulse response curve 310 as shown in FIG. 2), the echo canceller 121 may selectively ignore one (or more) of the delayed signal groups $X_2$, $X_4$, and $X_5$ (e.g., ignore the delayed signal group $X_5$). By analogy, where the communication channel 20 is a long wire (the impulse response curve 320 as shown in FIG. 2), the echo canceller 121 may selectively ignore one (or more) of the delayed signal groups $X_2$, $X_3$, and $X_4$ (e.g., ignore the delayed signal group $X_2$).

Figure 6:
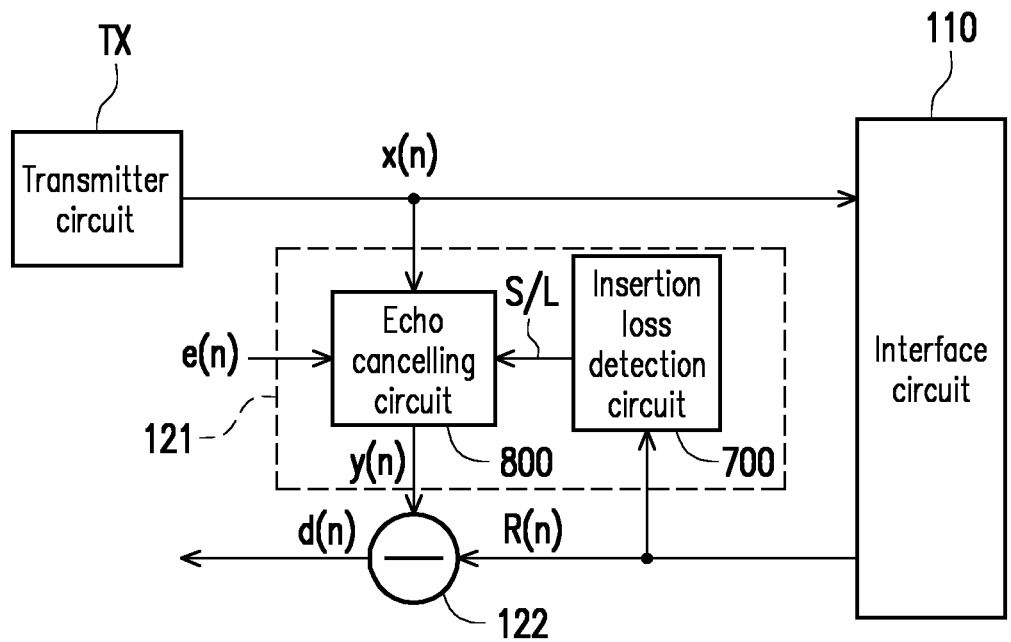
FIG. 6 is a schematic circuit block diagram showing the echo canceller as shown in FIG. 5 according to an embodiment of the disclosure.

FIG. 6 is a schematic circuit block diagram showing the echo canceller 121 as shown in FIG. 5 according to an embodiment of the disclosure. In the embodiment as shown in FIG. 6, the echo canceller 121 includes an insertion loss detection circuit 700 and an echo cancelling circuit 800. The insertion loss detection circuit 700 is coupled to the interface circuit 110 to receive the received signal R(n). The insertion loss detection circuit 700 may examine a power loss of the received signal R(n) to determine length information S/L of the communication channel 20.

The echo cancelling circuit 800 is coupled to the insertion loss detection circuit 700 to receive the length information S/L. The echo cancelling circuit 800 may obtain a plurality of delayed signals x1 to xN (e.g., x1 to x160) (not shown in FIG. 6) from the local signal x(n), where the delayed signals x1 to xN may be equally divided into B delayed signal groups X1 to XB (e.g., X1 to X5), and each delayed signal group includes NB delayed signals. The echo cancelling circuit 800 may selectively ignore at least one of the delayed signal groups X1 to XB according to the length information S/L, and take the other groups of the delayed signal groups X1 to XB as a plurality of tap input groups. The echo cancelling circuit 800 may generate the echo cancellation signal y(n) with the tap input groups. Depending on design requirements, the echo cancelling circuit 800 may include a least mean square (LMS) filter 800 and/or other filters. The echo cancelling circuit 800 may adaptively adjust the filter coefficient according to the echo noise e(n). According to the echo noise e(n), the echo cancelling circuit 800 may generate the echo cancellation signal y(n) with the tap input groups.

Take the embodiment as shown in FIG. 2 as an example, the echo cancelling circuit 800 may determine the length of the communication channel 20 according to the length information S/L, and further dynamically determine to ignore which of the delayed signal groups $X_1$ to $X_5$. Where the length information S/L indicates that the communication channel 20 is a short wire (the impulse response curve 310 as shown in FIG. 2), the echo cancelling circuit 800 may selectively ignore one (or more) of the delayed signal groups $X_2$, $X_4$, and $X_5$ (e.g., ignore the delayed signal group $X_5$). By analogy, where the length information S/L indicates that the communication channel 20 is a long wire (the impulse response curve 320 as shown in FIG. 2), the echo cancelling circuit 800 may selectively ignore one (or more) of the delayed signal groups $X_2$, $X_3$, and $X_4$ (e.g., ignore the delayed signal group $X_2$).

That is, with the property that echo impulse responses are mostly sparse, the echo cancelling circuit 800 may ignore calculation of the echo cancellation signal for the corresponding sparse portion to reduce the number of calculations. The portion where the impulse response is sparsely distributed is related to the length information of the channel. According to the length information S/L (wire length information) provided by the insertion loss detection circuit 700, the echo cancelling circuit 800 may determine to ignore calculation of the echo cancellation signal for the corresponding sparse portion.

Figure 7:
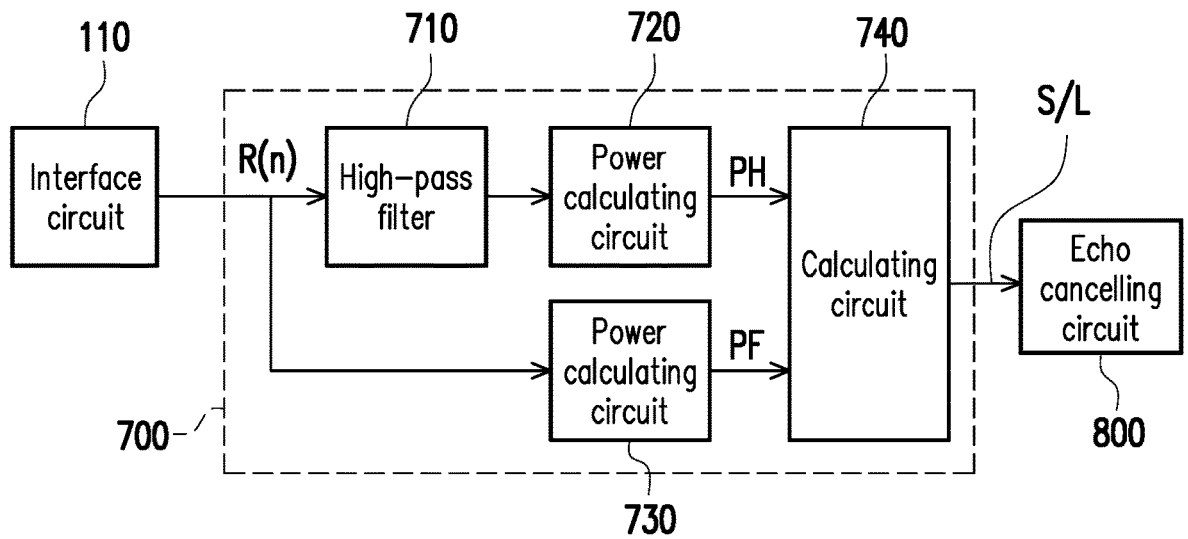
FIG. 7 is a schematic circuit block diagram showing the insertion loss detection circuit as shown in FIG. 6 according to an embodiment of the disclosure.

FIG. 7 is a schematic circuit block diagram showing the insertion loss detection circuit 700 as shown in FIG. 6 according to an embodiment of the disclosure. In the embodiment as shown in FIG. 7, the insertion loss detection circuit 700 includes a high-pass filter 710, a power calculating circuit 720, a power calculating circuit 730, and a calculating circuit 740. The high-pass filter 710 is coupled to the interface circuit 110 to receive the received signal R(n). The high-pass filter 710 may extract a high-frequency component of the received signal R(n) to the power calculating circuit 720. The power calculating circuit 720 is coupled to the high-pass filter 710 to receive the high-frequency component of the received signal R(n). The power calculating circuit 720 may calculate a high-band power PH of the high-frequency component. The power calculating circuit 730 is coupled to the interface circuit 110 to receive the received signal R(n). The power calculating circuit 730 may calculate a full-band power PF of the received signal R(n).

The calculating circuit 740 is coupled to the power calculating circuit 720 to receive the high-band power PH. The calculating circuit 740 is coupled to the power calculating circuit 730 to receive the full-band power PF. With the high-band power PH and the full-band power PF, the calculating circuit 740 may calculate a power loss rate (i.e., PH/PF). The calculating circuit 740 may determine the length information S/L according to the power loss rate PH/PF. As the power loss decreases, the PH/PF increases and the length of the communication channel 20 decreases. The calculating circuit 740 may compare, for example (but not limited to), the power loss rate PH/PF with a threshold THR. The threshold THR may be determined depending on design requirements. When the PH/PF is greater than the threshold THR, the calculating circuit 740 may determine that the communication channel 20 is a short wire, and notify the echo cancelling circuit 800 of the determination result through the length information S/L. On the contrary, when PH/PF is less than the threshold THR, the calculating circuit 740 may determine that the communication channel 20 is a long wire.

Figure 8:
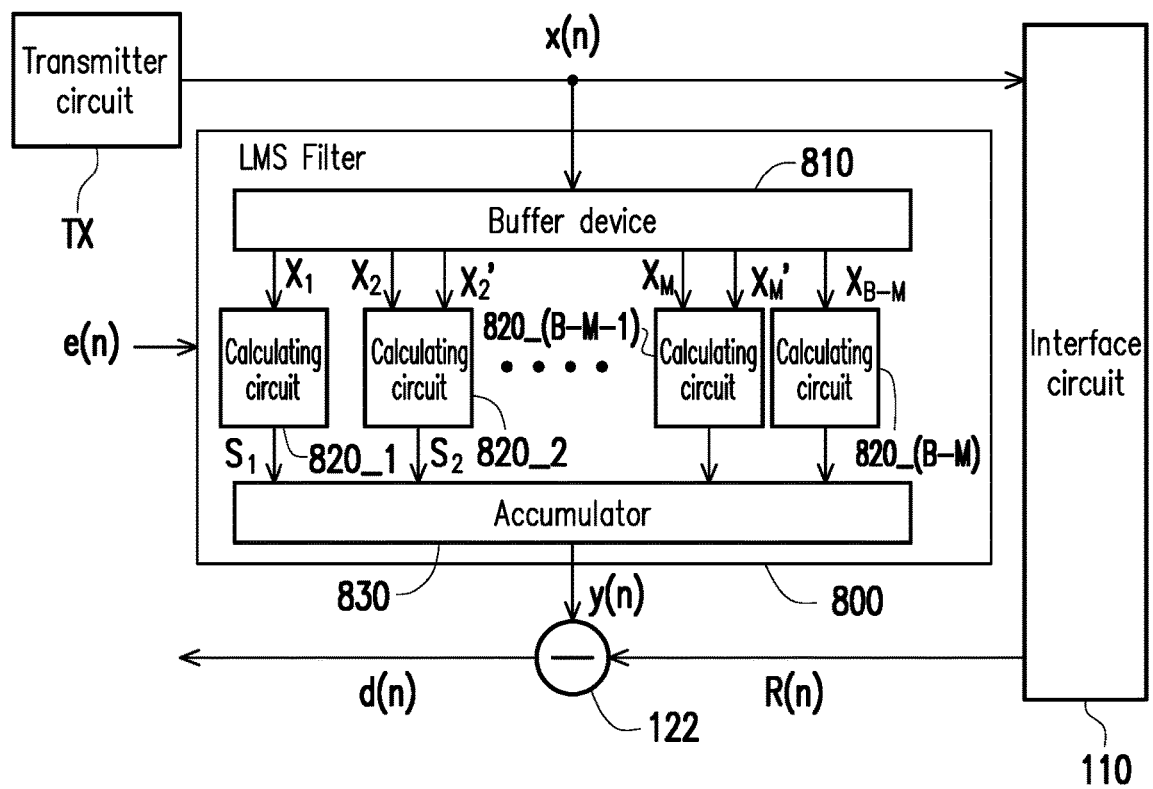
FIG. 8 is a schematic circuit block diagram showing the echo cancelling circuit as shown in FIG. 6 according to an embodiment of the disclosure.

FIG. 8 is a schematic circuit block diagram showing the echo cancelling circuit 800 as shown in FIG. 6 according to an embodiment of the disclosure. In the embodiment as shown in FIG. 8, the echo cancelling circuit 800 includes a buffer device 810, a plurality of calculating circuits (e.g., calculating circuits 820_1, 820_2, . . . , 820_(B-M-1), 820_(B-M) as shown in FIG. 8) and an accumulator 830. The buffer device 810 may buffer the local signal x(n) to output a plurality of delayed signals of the local signal x(n). For example, the buffer device 810 may obtain N delayed signals $x_1$ to $x_N$ (not shown in FIG. 8) from the local signal x(n), where the N delayed signals $x_1$ to $x_N$ may be divided into B delayed signal groups $X_1$ to $X_B$, and each delayed signal group X includes N/B delayed signals x. Assuming the buffer device 810 may obtain 160 delayed signals $x_1$ to $x_N$ from the local signal x(n) (i.e., N=160), where the delayed signals $x_1$ to $x_{160}$ may be equally divided into 5 delayed signal groups $X_1$ to $X_5$ (i.e., B=5), then the delayed signal group $X_1$ includes the delayed signals $x_1$ to $x_{32}$, the delayed signal group $X_2$ includes the delayed signals $x_{33}$ to $x_{65}$, the delayed signal group $X_3$ includes the delayed signals $x_{65}$ to $x_{96}$, the delayed signal group $X_4$ includes the delayed signals $x_{97}$ to $x_{128}$, and the delayed signal group $X_5$ includes the delayed signals $x_{129}$ to $x_{160}$.

The calculating circuits 820_1 to 820_(B-M) are coupled to the buffer device 810 to respectively receive one (or more) corresponding delayed signal group of the delayed signal groups $X_1$ to $X_B$. Each of the calculating circuits 820_1 to 820_(B-M) takes one of the delayed signal groups $X_1$ to $X_B$ as the corresponding tap input group. Each of the calculating circuits 820_1 to 820_(B-M) multiplies each tap input (delayed signal) in the corresponding tap input group by a corresponding coefficient (tap coefficient) to generate a corresponding product of each tap input. Each of the calculating circuits 820_1 to 820_(B-M) accumulates the corresponding products to generate a corresponding accumulation result to the accumulator 830.

Notably, the buffer device 810 generates the B delayed signal groups $X_1$ to $X_B$, but the number B-M of the calculating circuits 820_1 to 820_(B-M) is less than the number B of the delayed signal groups $X_1$ to $X_B$, where M is an integer greater than zero. M is the number of delayed signal groups to be omitted. Delayed signal groups $X_M$, $X_M'$, and $X_{B-M}$ as shown in FIG. 8 represent different groups of the delayed signal groups $X_1$ to $X_B$ generated by the buffer device 810. For implementation details of at least one calculating circuit (e.g., 820_(B-M-1)) of the calculating circuits 820_1 to 820_(B-M), reference may be made to description related to the calculating circuit 820_2 by analogy, and for implementation details of the other calculating circuits (e.g., 820_(B-M)) of the calculating circuits 820_1 to 820_(B-M), reference may be made to description related to the calculating circuit 820_1 by analogy.

For example, the calculating circuit 820_1 may receive the delayed signal group $X_1$ (as the corresponding tap input group) from the buffer device 810. The calculating circuit 820_1 may multiply each tap input (delayed signal) in the delayed signal group $X_1$ by the corresponding coefficient (tap coefficient) to generate the corresponding product. The calculating circuit 820_1 may accumulate the corresponding products corresponding to the delayed signal group $X_1$ to generate a corresponding accumulation result $S_1$ to the accumulator 830. For example, the calculating circuit 820_1 may calculate the corresponding accumulation result $S_1$ with Formula 2 below. In Formula 2, a coefficient $h_k$ represents a tap coefficient corresponding to a $k^{th}$ delayed signal $x_k$ (tap input) in the delayed signal group $X_1$ (corresponding tap input group).

$$S_1 = \Sum_{k=1}^{N/B} h_k^* x_k \qquad \text{Formula 2}$$

For another example, the calculating circuit 820_2 may receive two or more delayed signal groups from the buffer device 810, such as the delayed signal group $X_2$ and another delayed signal group $X_2'$. Depending on design requirements, the delayed signal group $X_2'$ may be a delayed signal group that may be selectively ignored according to the wire length, and the delayed signal group $X_2$ may be another delayed signal group that may be selectively ignored according to the wire length. The calculating circuit 820_2 may select a corresponding delayed signal group from the delayed signal groups (e.g., the delayed signal groups $X_2$ and $X_2'$) as the corresponding tap input group according to the length information S/L of the insertion loss detection circuit 700.

Taking the embodiment as shown in FIG. 2 as an example, assuming that the echo cancelling circuit 800 may dynamically determine to ignore one of the delayed signal groups $X_2$ and $X_5$ according to the length of the communication channel 20, then the delayed signal group $X_2'$ as shown in FIG. 8 may be the delayed signal group $X_5$. Where the communication channel 20 is a short wire (the impulse response curve 310 as shown in FIG. 2), the calculating circuit 820_2 may select the delayed signal group $X_2$ as the corresponding tap input group, and then multiply each tap input (delayed signal) in the corresponding tap input group by the corresponding coefficient to generate the corresponding product (i.e., ignore the delayed signal group $X_5$). The calculating circuit 820_2 may accumulate the corresponding products of the delayed signal group $X_2$ (corresponding tap input group) to generate a corresponding accumulation result $S_2$ to the accumulator 830. For calculation of the corresponding accumulation result $S_2$ by the calculating circuit 820_2, reference may be made to the description related to the calculation of the corresponding accumulation result $S_1$ by the calculating circuit 820_1 by analogy, so the same will not be repeatedly described.

Where the communication channel 20 is a long wire (the impulse response curve 320 as shown in FIG. 2), the calculating circuit 820_2 may select the delayed signal group $X_5$ (i.e., $X_2'$ as shown in FIG. 8) as the corresponding tap input group, and then multiply each tap input (delayed signal) in the corresponding tap input group by the corresponding coefficient to generate the corresponding product (i.e., ignore the delayed signal group $X_2$). The calculating circuit 820_2 may accumulate the corresponding products of the delayed signal group $X_5$ (corresponding tap input group) to generate the corresponding accumulation result $S_2$ to the accumulator 830.

The accumulator 830 is coupled to the calculating circuits 820_1 to 820_(B-M) to receive the corresponding accumulation results (e.g., $S_1$ and $S_2$). The accumulator 830 may accumulate the corresponding accumulation results to generate the echo cancellation signal y(n) to the combine circuit 122.

Figure 9:
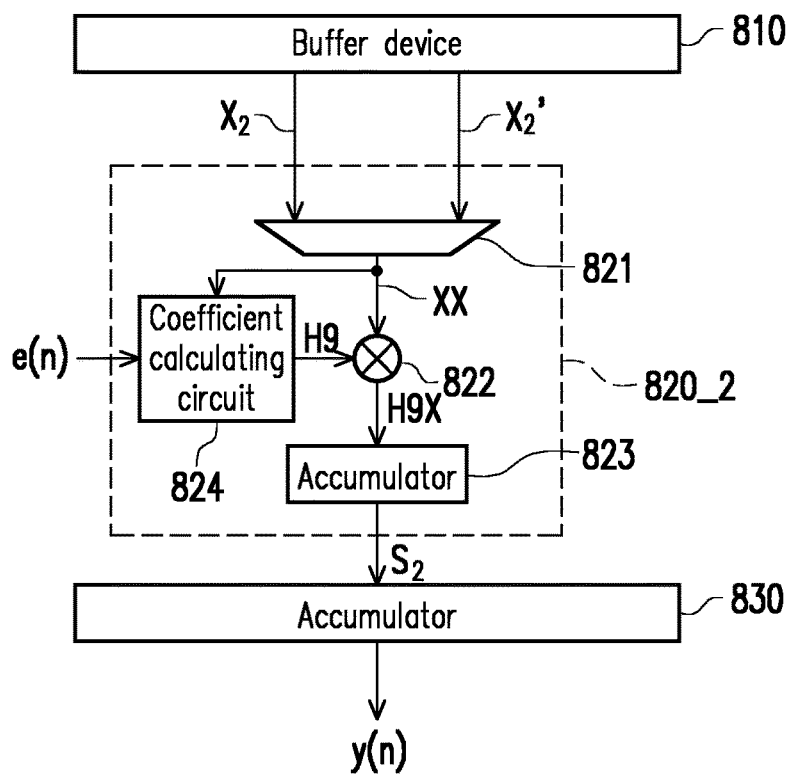
FIG. 9 is a schematic circuit block diagram showing the calculating circuit 820_2 as shown in FIG. 8 according to an embodiment of the disclosure.
Figure 10:
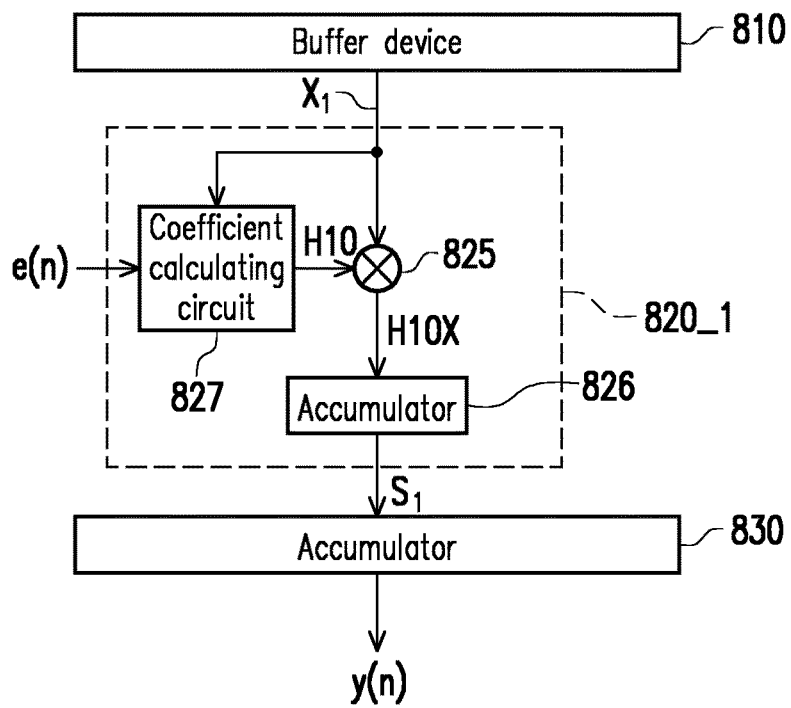
FIG. 10 is a schematic circuit block diagram showing the calculating circuit 820_1 as shown in FIG. 8 according to an embodiment of the disclosure.

FIG. 9 is a schematic circuit block diagram showing the calculating circuit 820_2 as shown in FIG. 8 according to an embodiment of the disclosure. FIG. 10 is a schematic circuit block diagram showing the calculating circuit 820_1 as shown in FIG. 8 according to an embodiment of the disclosure. For implementation details of at least one of the calculating circuits as shown in FIG. 8, reference may be made to the description related to the calculating circuit 820_2 as shown in FIG. 9 by analogy, and for implementation details of the other calculating circuits of the calculating circuits as shown in FIG. 8, reference may be made to the description related to the calculating circuit 820_1 as shown in FIG. 10 by analogy.

In the embodiment as shown in FIG. 9, the calculating circuit 820_2 includes a multiplexer 821, a multiplier 822, and an accumulator 823. The multiplexer 821 is coupled to the buffer device 810 to receive the delayed signal group $X_2$ and the delayed signal group $X_2'$. The multiplexer 821 may select one delayed signal group from the delayed signal group $X_2$ and the delayed signal group $X_2'$ as a corresponding tap input group XX according to the length information S/L of the insertion loss detection circuit 700. The multiplier 822 is coupled to the multiplexer 821 to receive the corresponding tap input group XX. The multiplier 822 may multiply each tap input (delayed signal) in the corresponding tap input group XX by a corresponding coefficient in a corresponding coefficient group (tap coefficient group) H9 to generate a corresponding product in a corresponding product group H9X (tap product group). The accumulator 823 is coupled to the multiplier 822 to receive the corresponding products of the corresponding product group H9X. The accumulator 823 may accumulate each tap product in the tap product group (corresponding product group H9X) to generate the corresponding accumulation result $S_2$ to the accumulator 830.

The calculating circuit 820_2 as shown in FIG. 9 further includes a coefficient calculating circuit 824. The coefficient calculating circuit 824 may calculate the corresponding coefficient group (tap coefficient group) H9 with the corresponding tap input group XX and the echo noise e(n) after echo cancellation, and provide the corresponding coefficient group H9 to the multiplier 822. In the embodiment, the calculation and algorithm of the coefficient calculating circuit 824 are not limited. Depending on design requirements, in some embodiments, the coefficient calculating circuit 824 may calculate the tap coefficient with conventional algorithms or other algorithms.

In the embodiment as shown in FIG. 10, the calculating circuit 820_1 includes a multiplier 825, an accumulator 826, and a coefficient calculating circuit 827. The coefficient calculating circuit 827 may take delayed signal group $X_1$ as the tap input group. The coefficient calculating circuit 827 may calculate a corresponding coefficient group (tap coefficient group) H10 with the delayed signal group $X_1$ and the echo noise e(n) after echo cancellation, and provide the corresponding coefficient group H10 to the multiplier 825. For the coefficient calculating circuit 827 as shown in FIG. 10, reference may be made to the description related to the coefficient calculating circuit 824 as shown in FIG. 9 by analogy, so the same will not be repeatedly described herein. The multiplier 825 is coupled to the buffer device 810 to receive the delayed signal group $X_1$. The multiplier 825 may multiply each tap input (delayed signal) in the delayed signal group $X_1$ by a corresponding coefficient in the corresponding coefficient group (tap coefficient group) H10 to generate a corresponding product in a corresponding product group (tap product group) H10X. The accumulator 826 is coupled to the multiplier 825 to receive the corresponding products of the corresponding product group H10X. The accumulator 826 may accumulate each tap product in the tap product group (corresponding product group H10X) to generate the corresponding accumulation result $S_1$ to the accumulator 830.

In summary of the foregoing, in the communication device 100 and the echo cancellation method thereof according to the description in the foregoing embodiments, through the length information of the channel provided by the insertion loss detection circuit 700, the echo cancelling circuit 800 may ignore the calculation of the echo cancellation signal corresponding to the sparse portion of the echo impulse response, and therefore selectively ignore at least one delayed signal group of the delayed signal groups $X_1$ to $X_B$, and generate the echo cancellation signal y(n) taking the other delayed signal groups as the tap input groups. Therefore, the communication device 100 cancels the echo component of the received signal R(n) on the premise of reducing the number of calculations as much as possible, so as to generate the cancelled signal d(n) to the receiver circuit RX.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An echo cancellation device adapted for a communication device, comprising:
   an echo canceller configured to obtain a plurality of delayed signals from a local signal of the communication device, wherein the delayed signals are divided into a plurality of delayed signal groups, the echo canceller selectively ignores at least one of the delayed signal groups, and the echo canceller generates an echo cancellation signal with the others of the delayed signal groups; and
   a combine circuit coupled to the echo canceller to receive the echo cancellation signal, and coupled to an interface circuit of the communication device to receive a received signal, wherein the combine circuit cancels an echo component of the received signal with the echo cancellation signal to generate a cancelled signal,
   wherein the echo canceller comprises:
      an insertion loss detection circuit coupled to the interface circuit to receive the received signal, wherein the interface circuit transmits the local signal of the communication device through a communication channel to a far end device, and the insertion loss detection circuit examines a power loss of the received signal to determine length information of the communication channel; and
      an echo cancelling circuit coupled to the insertion loss detection circuit to receive the length information, wherein the echo cancelling circuit is configured to obtain the delayed signals from the local signal, the echo cancelling circuit selectively ignores the at least one delayed signal group of the delayed signal groups according to the length information, and the echo cancelling circuit generates the echo cancellation signal with the other delayed signal groups of the delayed signal groups.

2. The echo cancellation device as described in claim 1, wherein the echo canceller dynamically determines to ignore which delayed signal group of the delayed signal groups according to a length of the communication channel.

3. The echo cancellation device as described in claim 1, wherein the insertion loss detection circuit comprises:
   a high-pass filter coupled to the interface circuit to receive the received signal, and configured to extract a high-frequency component of the received signal;
   a first power calculating circuit coupled to the high-pass filter to receive the high-frequency component, and configured to calculate a high-band power of the high-pass filter;
   a second power calculating circuit configured to calculate a full-band power of the received signal; and
   a calculating circuit coupled to the first power calculating circuit to receive the high-band power, and coupled to the second power calculating circuit to receive the full-band power, wherein the calculating circuit calculates a power loss rate with the high-band power and the full-band power, and the calculating circuit determines the length information according to the power loss rate.

4. The echo cancellation device as described in claim 1, wherein the echo cancelling circuit comprises a least mean square filter.

5. The echo cancellation device as described in claim 1, wherein the echo cancelling circuit comprises:
- a buffer device configured to buffer the local signal to output the delayed signals;
- a plurality of calculating circuits coupled to the buffer device to receive the delayed signal groups, wherein each of the calculating circuits takes one of the delayed signal groups as a corresponding tap input group, multiplies each of the delayed signals of the corresponding tap input group by a corresponding coefficient to generate a corresponding product, and accumulates the corresponding products to generate a corresponding accumulation result; and
- a first accumulator coupled to the calculating circuits to receive the corresponding accumulation results, wherein the first accumulator accumulates the corresponding accumulation results to generate the echo cancellation signal;
- wherein the delayed signal groups comprise a first delayed signal group and a second delayed signal group, and at least one calculating circuit of the calculating circuits selects a group from the first delayed signal group and the second delayed signal group as the corresponding tap input group according to the length information.

6. The echo cancellation device as described in claim 5, wherein the at least one calculating circuit of the calculating circuits comprises:
- a multiplexer coupled to the buffer device to receive the first delayed signal group and the second delayed signal group, wherein the multiplexer selects a group from the first delayed signal group and the second delayed signal group as the corresponding tap input group according to the length information;
- a multiplier coupled to the multiplexer to receive the corresponding tap input group, wherein the multiplier multiplies each of the delayed signals in the corresponding tap input group by the corresponding coefficient to generate the corresponding product; and
- a second accumulator coupled to the multiplier to receive the corresponding products, wherein the second accumulator accumulates the corresponding products to generate the corresponding accumulation result.

7. The echo cancellation device as described in claim 6, wherein the at least one calculating circuit of the calculating circuits further comprises:
- a coefficient calculating circuit configured to calculate the corresponding coefficient with the corresponding tap input group and provide the corresponding coefficient to the multiplier.

8. An echo cancellation method adapted for a communication device, comprising:
- obtaining a plurality of delayed signals from a local signal of the communication device by an echo canceller, wherein the delayed signals are divided into a plurality of delayed signal groups;
- selectively ignoring at least one of the delayed signal groups, and generating an echo cancellation signal with the others of the delayed signal groups by the echo canceller; and
- receiving a received signal from an interface circuit of the communication device, and cancelling an echo component of the received signal with the echo cancellation signal to generate a cancelled signal by a combine circuit,
- wherein the interface circuit transmits the local signal of the communication device to a far end device through a communication channel, and the echo cancellation method further comprises:
  - examining a power loss of the received signal to determine length information of the communication channel by an insertion loss detection circuit of the echo canceller;
  - obtaining the delayed signals from the local signal by an echo cancelling circuit of the echo canceller; and
  - selectively ignoring the at least one delayed signal group of the delayed signal groups according to the length information, and generating the echo cancellation signal with the other delayed signal groups of the delayed signal groups by the echo cancelling circuit.

9. The echo cancellation method as described in claim 8, wherein the echo cancellation method further comprises:
- dynamically determining to ignore which delayed signal group of the delayed signal groups according to a length of the communication channel by the echo canceller.

10. The echo cancellation method as described in claim 8, further comprises:
- extracting a high-frequency component of the received signal by a high-pass filter of the insertion loss detection circuit;
- calculating a high-band power of the high-pass filter by a first power calculating circuit of the insertion loss detection circuit;
- calculating a full-band power of the received signal by a second power calculating circuit of the insertion loss detection circuit;
- calculating a power loss rate with the high-band power and the full-band power by a calculating circuit of the insertion loss detection circuit; and
- determining the length information according to the power loss rate by the calculating circuit.

11. The echo cancellation method as described in claim 8, wherein the echo cancelling circuit comprises a least mean square filter.

12. The echo cancellation method as described in claim 8, further comprises:
- buffering the local signal to output the delayed signals by a buffer device of the echo cancelling circuit;
- taking one of the delayed signal groups as a corresponding tap input group, multiplying each of the delayed signals of the corresponding tap input group by a corresponding coefficient to generate a corresponding product, and accumulating the corresponding products to generate a corresponding accumulation result by each of a plurality of calculating circuits of the echo cancelling circuit, wherein the delayed signal groups comprise a first delayed signal group and a second delayed signal group, and at least one calculating circuit of the calculating circuits selects a group from the first delayed signal group and the second delayed signal group as the corresponding tap input group according to the length information; and
- accumulating the corresponding accumulation results to generate the echo cancellation signal an accumulator of the echo cancelling circuit.

* * * * *